(12) United States Patent
Al-Samadi

(10) Patent No.: US 8,679,347 B2
(45) Date of Patent: Mar. 25, 2014

(54) MULTI-USE HIGH WATER RECOVERY PROCESS

(76) Inventor: Riad A. Al-Samadi, Burlington (CA)

( * ) Notice: Subject to any disclaimer, the term of this patent is extended or adjusted under 35 U.S.C. 154(b) by 253 days.

(21) Appl. No.: 13/116,413

(22) Filed: May 26, 2011

(65) Prior Publication Data

US 2011/0315631 A1 Dec. 29, 2011

Related U.S. Application Data

(60) Provisional application No. 61/348,304, filed on May 26, 2010.

(51) Int. Cl.
*C02F 1/42* (2006.01)
*C02F 1/44* (2006.01)
*C02F 9/02* (2006.01)

(52) U.S. Cl.
USPC .......... 210/663; 210/660; 210/652; 210/650; 210/636; 210/638; 210/805; 210/806; 210/670; 210/677

(58) Field of Classification Search
None
See application file for complete search history.

(56) References Cited

U.S. PATENT DOCUMENTS

| | | | |
|---|---|---|---|
| 3,639,231 A | 2/1972 | Bresler | |
| 5,364,525 A * | 11/1994 | Hagqvist et al. | ............... 210/190 |
| 6,113,797 A | 9/2000 | Al-Samadi | |
| 6,416,668 B1 | 7/2002 | Al-Samadi | |
| 6,461,514 B1 | 10/2002 | Al-Samadi | |
| 6,537,456 B2 | 3/2003 | Mukhopadhyay | |
| 7,077,962 B2 | 7/2006 | Pipes | |
| 7,132,052 B2 | 11/2006 | Rawson et al. | |
| 7,514,001 B2 | 4/2009 | Costa | |
| 7,875,186 B2 | 1/2011 | Coppola et al. | |
| 2002/0017495 A1* | 2/2002 | Iizuka et al. | .................. 210/739 |
| 2008/0173583 A1 | 7/2008 | Boodoo et al. | |
| 2010/0166626 A1* | 7/2010 | Bauder et al. | .................. 423/24 |
| 2010/0193444 A1 | 8/2010 | Boodoo | |
| 2011/0278225 A1 | 11/2011 | Boodoo | |

FOREIGN PATENT DOCUMENTS

WO 2009131635 A2 10/2009

OTHER PUBLICATIONS

Everest, William R. et al., "Groundwater Reclamation by Innovative Desalting in Orange County, California," Desalination, vol. 117, Issues 1-3, Sep. 20, 1998, abstract, Elsevier.
Purolite, "Purolite SST65," retrieved from http://www.purolite.com/relid/606273/ccptid/1394/productid/706/isvars/default/strong_acid_cation_gel.htm, 2013.

* cited by examiner

*Primary Examiner* — David C Mellon
(74) *Attorney, Agent, or Firm* — Hodgson Russ LLP

(57) ABSTRACT

Disclosed is a versatile multi-use high water recovery process that integrates the use of water purification membranes including reverse osmosis and nanofiltration with ion exchange water softening resins in a number of configurations that optimize operation and achieve maximum membrane permeate recoveries while eliminating the use of fresh water, sodium chloride and other chemicals needed to regenerate the IX resin. The invention provides process mobility and flexibility that enable selection of optimum process configurations and features to address variability in the Influent Water quality.

9 Claims, 5 Drawing Sheets

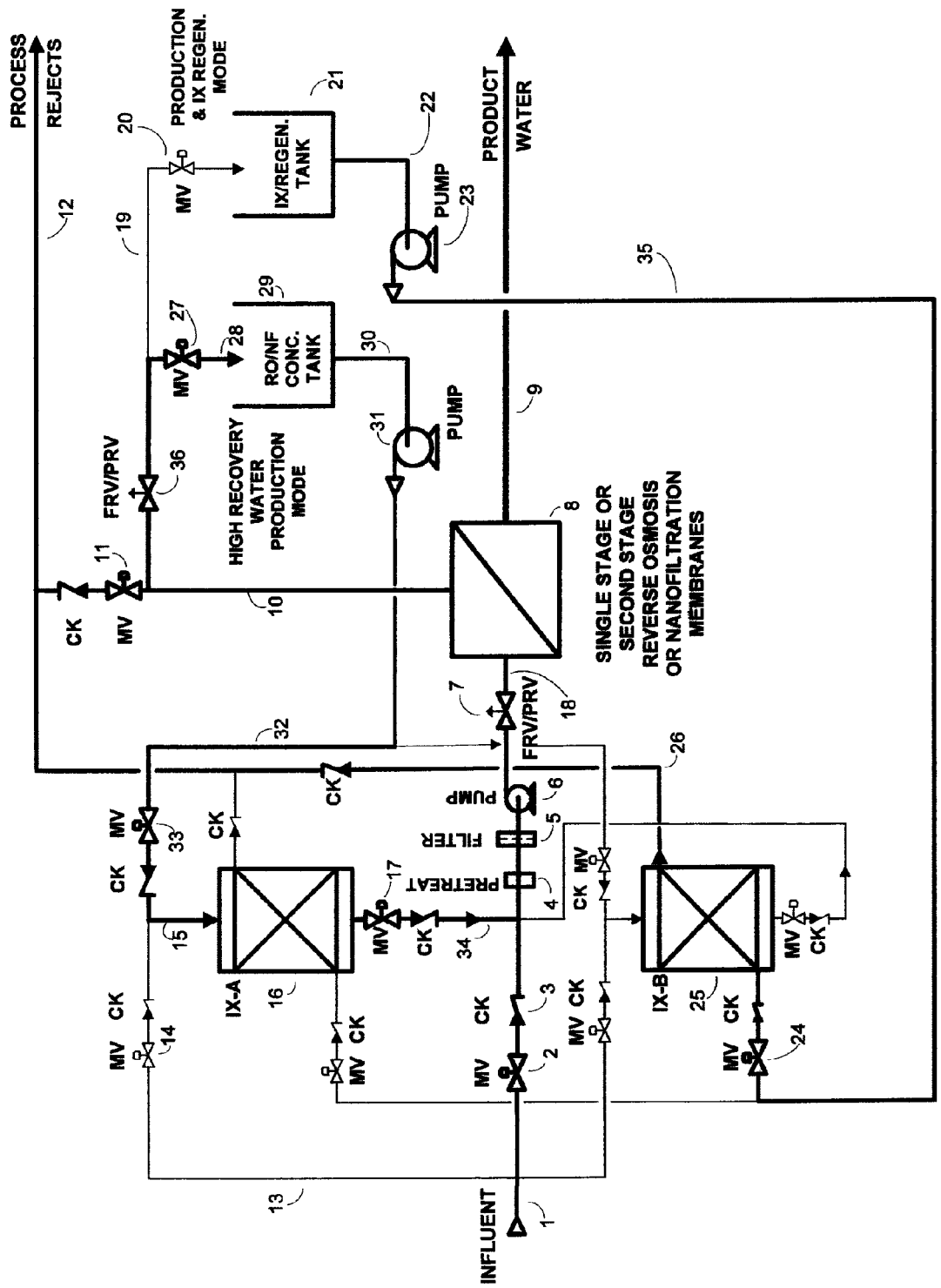

MULTI-USE HIGH WATER RECOVERY PROCESS

CROSS REFERENCE TO RELATED APPLICATIONS

The present invention claims priority to U.S. Provisional Patent Application No. 61/348,304, filed May 26, 2010, which is incorporated herein by reference in its entirety.

FIELD OF THE INVENTION

The present invention relates to membrane-based water purification. In particular, the present invention teaches a method, a process and a system design aimed at improving the performance and increasing the permeate recovery percentage from a reverse osmosis or nanofiltration membrane system while minimizing the volume of wastewater generated from the process.

BACKGROUND OF THE INVENTION

Hardness compounds such as barium, calcium, magnesium, iron, silica, carbonate and bi-carbonate, fluoride and sulfate are commonly found in surface water supplies such as lakes and rivers as well as groundwater supplies such as water wells and aquifers and in aqueous industrial effluents and landfill leachates. Water containing hardness compounds is frequently purified by using water softeners and demineralizers in the form of "ion exchange resins, IX", chemical softeners using the cold lime or hot lime softening process, reverse osmosis (RO) membranes, nanofiltration (NF) membranes and/or distillation. Industry needs purified water containing low to very low concentrations of hardness compounds and of soluble inorganic compounds in order to supply their cooling towers, low-pressure and high pressure boilers, heat exchangers and various process uses. On the other hand, the pharmaceutical and electronics' industries as well as hospitals and laboratories require high purity water that is almost completely free from inorganic compounds.

The conventional water treatment processes listed above are not suitable or efficient because, in the case of IX, the process involves the inefficient transfer of soluble and "sparingly soluble" water impurities to a resin bed which must be regenerated using chemicals and/or disposed of at high cost. In the case of lime softening, large quantities of chemicals are added and large chemical waste volumes are generated. If conventional RO or NF membranes are used, substantial volumes of RO or NF membrane concentrates will be generated because the permeate recovery (percentage) from these processes is normally limited to approximately 70%-75% and the concentrates must therefore be treated further or disposed of at a large cost. Finally, the very high capital and/or operating costs associated with the direct application of distillation processes normally preclude the use of distillation as a single-step treatment method.

The main reason why high purified water recoveries >90% from "conventional" RO and NF membranes are not possible is the tendency of inorganic scale such as calcium carbonate, calcium sulfate and silica to form on the surface of the membranes as the concentration of these compounds is increased beyond their saturation values. Deposition of such compounds frequently results in the loss of purified water production (also known as loss of permeate flux through the membrane) and the eventual need for costly replacement of the membranes.

The use of chemical additives in the water supply such as acids to reduce the pH and inorganic or organic scale inhibitor compounds is practiced in the water treatment and membrane industry in order to provide some improvement in the water recovery and prevent scale formation. However, such improvement is of limited extent since no scale inhibitor is effective for all the contaminants nor for all permeate recovery ranges and therefore they do not represent a viable option for the treatment of the entire water stream.

Ion exchange resins, including strong acid cation exchange resins (SAC), weak acid cation exchange resins (WAC) or chelating ion exchange resins are used to "soften" the Influent Water introduced into RO or NF membranes by removing divalent and multivalent hardness ions, thus reducing the scaling potential of the water and enabling higher permeate recoveries to be achieved. However, this membrane pretreatment is deemed to be very costly, since it removes all of the hardness from the entire Influent Water even though the RO membranes can tolerate some hardness, especially if low-dose, effective anti-scalant chemicals are used. Leakage of hardness ions through the IX water softeners used to pretreat the Influent Water will limit the permeate recovery of the RO or NF membranes due to build-up of these hardness ions concentrations in the membrane concentrate stream, thus potentially causing premature precipitation and scale formation. The SAC or WAC cation exchange membranes used in water softening are also unable to remove weakly ionized soluble silica from the Influent Water, which can therefore limit the permeate recovery as the silica concentration increases by an order of magnitude or higher across the RO or NF membranes. Furthermore, the IX resin will become saturated with divalent and multivalent hardness ions including calcium and magnesium which must then be removed periodically by using low impurity salt solution containing up to 10% of pure sodium chloride to ensure complete hardness removal from the resin and absence of hardness leakage in the service mode.

Attempts have been made in recent years to address the hardness and silica limitations by efficiently removing the hardness from the RO or NF membrane concentrate using ion exchange, chemical precipitation or other efficient water softening methods followed by recycling of the hardness-free membrane concentrate to the influent or low pressure side of the membranes to achieve further water purification and realize permeate recoveries >95%. When chemical precipitation softening methods are used, the process complexity and capital and operating costs increase, rendering these processes less attractive. Furthermore, when ion exchange is used for softening of the membrane concentrate, the IX resin must be periodically regenerated with pure, high-strength sodium chloride salt solutions that must be prepared using purified membrane permeate. Use of these salt solutions adds to the operating cost, introduces an undesirable chemical as a new waste into the environment and adversely impacts on the overall purified water recovery of the process.

In addition to the above limitations, it is often unclear when designing a high-recovery process what the optimum water purification process would be, i.e. is it a simple reverse osmosis (RO) system? Is it an RO system that incorporates the addition of anti-scalant to increase the solubility of sparingly soluble hardness and silica compounds thus increasing the recovery, say from 60-70% to 80%? Is it an RO process that is preceded by a SAC or WAC IX pretreatment step that increases the nominal purified water recovery to 85%-90%, or is it a single stage or 2-stage high-recovery process that post-softens the RO or NF membrane concentrate using SAC IX and recycles the softened RO concentrate to achieve purified water recoveries >90% and even >95%? And will these processes need to use the undesirable sodium chloride salt solution to regenerate the IX resin.

PRIOR ART

A survey of prior art shows the following relevant patents and publications:

U.S. Pat. No. 3,639,231 (Bresler, February 1972) discloses the use of WAC or SAC ion exchange resin to remove divalent and multivalent hardness ions from the Influent Water as pretreatment to reverse osmosis. The pretreated water is purified using RO membranes and the RO membrane concentrate is used fully or partially to regenerate the SAC IX resin used in the softening step, thus reducing or eliminating use of sodium chloride salt in the regeneration process.

Everest et. al. (Elsevier, Desalination 117, 1998) demonstrated in a pilot plant the feasibility of using RO concentrate to regenerate the SAC IX resin used for softening pretreatment. Sodium metabisulfite was added to the RO concentrate to prevent iron fouling of the IX resin. Everest et. al. noted that by using the RO concentrate to regenerate the IX resin, a leakage of approximately 30 mg/L of hardness was obtained, starting with a hardness of 1000 mg/L in the Influent Water, thus requiring augmentation of the RO concentrate with commercial salt to improve the IX resin regeneration effectiveness.

U.S. Pat. No. 6,416,668 B1 (Al-Samadi, July 2002) discloses a Water Treatment Process for Membranes wherein cationic inorganic and/or polymeric flocculants are added to the Influent Water to coagulate and flocculate water-borne colloidal matter, followed by filtration using a multi-media filter to remove said colloidal matter. The electric charge of the pretreated Influent Water is subsequently neutralized by using a suitable cation exchange resin, including SAC or WAC IX, followed by a reverse osmosis membrane purification step which will produce purified product water with recoveries >80%, without the risk of deposition of colloidal matter or scale compounds on the surface of the spirally-wound or hollow fiber membranes. However, U.S. Pat. No. 6,416,668 B1 does not teach reuse of RO membrane concentrate to regenerate the IX resin and further reduce the volume of the process rejects. Furthermore, this patent does not teach process flexibility to simplify operation, and select the appropriate process features and configuration depending on the characteristics of the Influent Water.

U.S. Pat. No. 6,461,514 B1 (Al-Samadi, October 2002) discloses a high recovery single stage membrane process wherein pretreated Influent Water is purified using a single stage RO or NF membrane system, followed by softening of the RO concentrate by passage through a suitable IX resin. The IX-softened membrane concentrate is continuously recycled at a sufficiently high flow rate to the low pressure side of the membranes in order to achieve product water recoveries in the range 95%-99% without the risk of precipitation of scale compounds on the membrane surface. However, U.S. Pat. No. 6,461,514 B1 does not teach reuse of RO membrane concentrate to regenerate the IX resin and further reduce the volume of the high recovery process rejects. Furthermore, this patent does not teach process flexibility to simplify operation, and select the appropriate process features and configuration depending on the characteristics of the Influent Water.

U.S. Pat. No. 6,537,456 (Mukhopadhyay, March 2003) discloses a process for purifying Influent Water containing hardness and silica using RO membranes wherein the Influent Water is pretreated by Weak Acid Cation exchange (WAC) resins to completely remove the divalent and multivalent ions, followed by raising the pH to at least 8.5 in order to ionize and solubilize the silica and prevent its scale formation on the RO membranes. The pretreated water is then introduced into the RO membrane system wherein the pretreated Influent Water is demineralized, producing RO permeate at high product water recoveries greater than 90% without scale formation, precipitation or fouling of the RO membranes. U.S. Pat. No. 6,537,456 uses WAC IX resin which must be regenerated with acid and neutralized with alkaline solutions, adds acid to neutralize the alkaline pH of the final product water and of the RO reject stream before the latter can be disposed of or further treated. Further, U.S. Pat. No. 6,537,456 generates new chemical waste in the form of spent WAC IX resin regenerating fluid, as well the RO concentrate which can not be used to regenerate the WAC IX resin.

U.S. Pat. No. 7,077,962 (Pipes, July 2006) discloses a method for softening and demineralizing of potable water, said method comprising the steps of: providing a reverse osmosis (RO) membrane; introducing potable water to said RO membrane in order to produce an RO permeate and an RO concentrate; providing a microfiltration (MF) membrane; introducing the RO concentrate to said MF membrane to produce an MF permeate and an MF concentrate; recycling the RO permeate to the potable water for return to said RO membrane; recycling a portion of the MF concentrate to the potable water for return to said RO membrane at a pH level suitable for suppressing deposition of solids on the RO membrane; providing a pressured concentrate storage tank including seed crystals; introducing the RO concentrate into said concentrate storage tank at a pH that is conducive to metastable precipitation of calcium carbonate on the seed crystals; and providing RO permeate for use through a delivery line. However, U.S. Pat. No. 7,7077,962 does not teach high RO permeate recoveries greater than 90%, does not teach reuse of RO membrane concentrate to regenerate IX softening resin since IX resin is not used in the process, and it does not teach process flexibility to simplify operation and select the optimum process configuration depending on Influent Water characteristics.

U.S. Pat. No. 7,132,052 (Rawson et. al., November 2006) discloses a method of purifying and recycling spent brine from water softeners wherein the spent brine, after dilution with water, is passed through a nanofiltration (NF) membrane to separate the monovalent (salt) ions from the divalent ions. The stream containing monovalent ions is then passed through a reverse osmosis (RO) membrane to produce a concentrate stream containing monovalent (salt) ions which concentrate stream can be used to regenerate the IX resin. While U.S. Pat. No. 7,132,052 teaches the recovery of monovalent salt ions in order to regenerate the IX resin and thus reduce or eliminate commercial salt use, the patent does not teach maximizing the permeate recovery from RO membranes, nor does it teach minimizing the hardness leakage through the IX resin.

Purolite (Application Notes—Regenerating SST with RO Reject Water, February 2009) teaches further improvement in the effectiveness of RO concentrate for regeneration of the SAC ion exchange resin by using Shallow-Shell IX resin beads in lieu of conventional SAC IX resin beads. In Shallow Shell IX resin beads, ion exchange takes place in the active, thin outer layers of the resin bead, with the core being totally inert, thereby increasing the rate of diffusion and exchange of the divalent and multivalent ions, as well as the rates of displacement (i.e. regeneration) of these hardness ions with monovalent cations. Pilot studies have shown that Purolite's SST80DL resin can be regenerated effectively using brine concentrations as low as 1%, compared to the 10% salt solution normally required for SAC IX resin regeneration.

U.S. Pat. No. 7,514,001 (Costa, et. al., April 2009) teaches a process for treating a high silica feedwater using a reverse osmosis treatment apparatus comprising RO membranes and operating at high recovery while avoiding formation of alkali-soluble silica-containing scale on the membranes by controlling the pH of the RO concentrate to an acidic pH below 3.9 to produce an RO product water representing about 94% of the feedwater. However, U.S. Pat. No. 7,514,001 does not teach reuse of RO membrane concentrate to regenerate IX softening resin since IX resin is not used in the process, and it does not teach process flexibility to simplify operation and select the optimum process configuration depending on Influent Water characteristics.

Examples of Current Treatment Methods

The above-referenced patents and other available literature have aimed at preventing precipitation of inorganic scale and other membrane fouling compounds when the water is purified using reverse osmosis and nanofiltration membranes. Prior Art also teaches methods and means to improve the product water recovery rates by providing effective means including chemical precipitation, pH adjustment and use of SAC or WAC IX resins to remove sparingly soluble hardness and multivalent ions and remove or solubilize silica compounds in the pretreatment step, e.g. U.S. Pat. No. 3,639,231 (Bresler), U.S. Pat. No. 6,416,668 B1 (Al-Samadi) and U.S. Pat. No. 6,537,456 (Mukhopadhyay). Further improvements in the product water recovery rates are described in U.S. Pat. No. 6,461,514 B1 and U.S. Pat. No. 6,113,797 (Al-Samadi) where removal of hardness, silica and multivalent ions are applied to the RO concentrate as a post-treatment step, followed by recycling of hardness-free RO concentrate to the low pressure side of the membrane system to enable further processing, thereby achieving product water recoveries >90%. U.S. Pat. No. 6,461,514 B1 represents substantial process benefits since it comprises a simple process configuration that includes RO followed by IX (i.e. RO-IX$_c$, where subscript "c" refers to the RO concentrate). By placing the IX unit after the RO membranes, more efficient net removal of hardness ions is achieved, while using smaller, lower cost equipment and lower operating costs. The ion exchange resin used in U.S. Pat. No. 6,461,514 B1 is preferably Strong Acid Cation (SAC) resin, although Weak Acid Cation (WAC) resin can also be used, when the Influent Water total dissolved solids concentration is high, e.g. >2000 mg/L. As an example, when the Influent Water silica concentration is <10 mg/L, U.S. Pat. No. 6,461,514 B1 enables product water recoveries >95% to be achieved using this simple RO-IX$_c$ process.

Because of the colloidal matter, hardness and silica generally present in surface waters, service wells and aquifers, industry (and municipalities, in certain applications) have had to resort to fairly extensive pretreatment of the water before use, commonly including fine filtration and water softening using SAC IX softeners. Several industries, including chemical manufacturers and consumer product manufacturers also use RO membrane systems on the pretreated water, to produce water for boilers, cooling towers and other plant use, operating the RO at product water recoveries in the range 70%-75%. While application of Prior Art processes (e.g. U.S. Pat. No. 6,416,668 B1 and U.S. Pat. No. 6,537,456) increase the product water recovery from 75% to >90% or even to >95%, these processes do not address the problems associated with use of commercial salt for regeneration of the SAC IX resin, i.e. its adverse impact on the environment, its cost and its impact on the product water recovery.

In order to address the environmental challenges associated with commercial salt use, U.S. Pat. No. 3,639,231 (Bresler) teaches the use of RO concentrate to regenerate the SAC IX resin used in pretreatment of the Influent Water. Since incomplete regeneration is achieved as a result of the low salt strength of the RO concentrate which is typically 5,000 mg/L-10,000 mg/L (i.e. 0.5-1.0%, compared to the normal required commercial salt strength of 10%), U.S. Pat. No. 3,639,231 teaches augmentation of the RO concentration with salt to achieve complete regeneration of the SAC IX resin. Leakage of hardness and other sparingly soluble ions from incompletely regenerated resin can limit the product water recovery since these ions are concentrated by a factor of 10-25, corresponding to permeate recoveries of 90%-96%, over the high-recovery RO membranes. Everest et. al. (Elsevier, Desalination 117, 1998) investigated the application of IX softening pretreatment of high-salinity groundwater from the Capistrano Beach Water District (CA) with a hardness of approximately 1000 mg/L as $CaCO_3$, followed by reverse osmosis treatment to produce good quality water for the water district. Everest et. al. also investigated the use of RO concentrate to regenerate the SAC IX resin and concluded that the RO concentrate should be augmented with commercial salt to minimize hardness leakage from the IX and ensure reliable operation.

While Prior Art processes have been concerned with increasing the membrane process product water recovery on one hand and addressing the problems associated with use of commercial salt by using RO concentrates to regenerate the SAC IX resins used as pretreatment for the RO, these processes have not been able to achieve the maximum benefits described hitherto. Prior Art processes have not been able to achieve the maximum membrane system product water recovery (viz. >90% and preferably >95%), while simultaneously reusing the membrane concentrate to effectively regenerate the IX resin, thereby further improving the net product water recovery and eliminating use of commercial salt for regenerating the IX resin. It is also known that the Influent Water quality, and in particular the total dissolved solids (TDS) and the concentration of hardness and other multivalent cations and silica associated with surface water and more particularly with groundwater, will vary over time, for example over a period of five years. Prior Art processes do not address this variability in the Influent Water quality and the need to modify the high-recovery process configuration, depending on the TDS, hardness and silica concentrations.

This invention addresses the above limitations by providing an improved, simple, and economical system and process for the purification of surface water, groundwater, municipal or industrial effluents. Said system and process achieves high product water recoveries greater than 90% and even greater than 95% of the volume of the Influent Water, depending on the Influent Water TDS, while simultaneously using the membrane concentrate to effectively regenerate the IX resin, thereby obviating the need to use commercial salt. This invention also provides the flexibility to use different process configurations using the same system in order to optimize operation, depending on the Influent Water quality. If needed, said system and process can be designed to be mobile by mounting it on appropriate skids and transporting it to different locations in order to process Influent Water with different feed characteristics and yet achieve optimum water purification objectives.

SUMMARY OF THE INVENTION

I have found the above disadvantages and limitations of Prior Art can be overcome by providing a versatile "multi-use" automated process wherein the membrane permeate recovery is maximized by eliminating use of fresh water and eliminating use of sodium chloride or other chemicals used to regenerate the ion exchange (IX) resin.

It is an object of this invention to provide a simple membrane-based system and a process that purifies surface water, groundwater and industrial and municipal wastewater and achieves high permeate recoveries in the range 90% to 99%.

It is another object of the invention to use ion exchange water softening resins to remove sparingly soluble hardness cations including calcium and magnesium, iron and aluminum in a manner that would prevent scale formation on the surface of the membranes used to purify the water.

It is still another object of the invention to produce a membrane concentrate of sufficiently high salinity, with a TDS>10,000 mg/L and to use this membrane concentrate to regenerate the water softening ion exchange resin, thereby reducing the clean water consumption of the process by 1-5% and simultaneously obviate the need to use large quantities of commercial (sodium chloride) salt, thereby reducing the operating cost associated with producing purified water and mitigating the adverse environmental impact associated with using commercial salt.

It is yet another object of the invention to provide a versatile and yet simple system and a process that can adapt to variable Influent Water quality, a process that can optimize operation and achieve the best membrane permeate recovery while minimizing the operating cost.

It is yet another object of the invention to provide a process that comprises mobile systems and equipment, including cartridge filters, anti-scalant dosing system, skid-mounted spirally-wound reverse osmosis or nanofiltration membrane modules, ion exchange resin columns, pumps, small tanks, piping, instrumentation and automated controls. Said mobile systems can be readily transported to the sites where surface water, groundwater or wastewater need to be purified to produce high quality water for people and industry, while producing a minimum volume of waste or reject streams.

These and other objects of this invention will become clear from the specification, claims and drawings appended hereto.

In accordance with these objects, there is provided a versatile multi-use automated system and a process that uses a dual-column IX water softening system and a multitude of motorized automated shut-off valves, check valves and flow and pressure regulators that enable use of the same IX resin, initially as a pretreatment system to soften the Influent Water and later as post treatment system for softening the high TDS membrane concentrate.

The membrane system can be the first and only membrane stage, or if the Influent Water has already been processed through an existing reverse osmosis (RO) or nanofiltration (NF) membrane system, then the membrane system described in the invention would be a second stage membrane system that takes the concentrate from the first stage and purifies it further, thus achieving improved permeate recoveries.

As indicated in the four steps listed below, the first process step is produce RO concentrate (brine) of TDS concentration>10,000 mg/L for the IX resin regeneration, while simultaneously purifying water through the RO membranes. By setting the appropriate automated shut-off valves in the required on or off positions, the Influent water will be introduced into one of the two water softening IX resin columns, where the hardness and multivalent ions are virtually completely removed. The hardness-free water is then introduced into the RO membrane system which is operated at approximately 90% permeate recovery, producing high TDS water for resin regeneration which is stored in the RO/NF Concentrate Tank.

This step is automatically followed by the normal high water recovery step where the Influent Water is now introduced directly into the RO membranes, followed by IX which removes the hardness built-up in the RO concentrate, followed by recycling of the hardness-free RO concentrate from the IX column to the Influent Water where it can be used to achieve further permeate recovery. A small RO concentrate stream normally <5% of the Influent Volume is removed from the process to control osmotic pressure. Simultaneously, RO concentrate in the IX Regeneration Tank (IRT) is used to regenerate the second (i.e. stand-by) spent IX resin, thus preparing a fresh IX resin for the next service cycle. As shown in the list below, the above steps are repeated, this time with the second IX resin column being used in an automated manner, followed by the RO system to produce brine for resin regeneration, thereafter switching to the high recovery mode and IX resin regeneration mode. These four repetitive automated steps are listed below for clarity:

1. IXA-RO-IRT (Brine Production Mode as well as RO Purification)
2. RO-IXA, plus IRT-IXB (High Recovery RO+simultaneous $2^{nd}$ IX Regen)
3. IXB-RO-IRT (Brine production via $2^{nd}$ IX resin)
4. RO-IXB, plus IRT-IXA (High Recovery RO+simultaneous $1^{st}$ IX Regen)

In an exemplary embodiment, the present invention provides a Multi-use Membrane System that treats Influent surface water, brackish water, municipally treated water, industrial and municipal effluents and produces reverse osmosis membrane permeate recoveries in the range 50%-99% of the Influent water volume, comprising: a) pretreatment of said Influent using effective pretreatment methods including but not limited to filtration, pH adjustment and addition of anti-scalant to produce Pretreated Influent with Silt Density Index $SDI_{15}$<5 and preferably <3; b) dual ion exchange (IX) water softening resin columns to be operated in a swing-type manner with one column operating in Service mode and the second in a Regeneration Mode; c) a reverse osmosis (RO) membrane system used to purify said Pretreated Water and produce a membrane permeate Product Water and a membrane concentrate; d) ion Exchange Regenerant solution holding tank to contain a membrane concentrate volume in the range 100-10,000 U.S. gallons of membrane concentrate that can be used to regenerate the spent IX resin; e) a membrane concentrate holding tank to provide membrane concentrate for recycle through said IX water softening resin; f) pumps used to pressurize said Influent water to said membrane system and transfer said membrane concentrate to said IX water softening columns; g) automated motorized valves, solenoid valves or air-operated shut-off valves which are opened and closed automatically in a predetermined sequence to enable operation of said Multi-use Membrane Process in one of five Water Purification Modes ranging in product water recoveries from 50% to 99%; h) check-valves incorporated in a number of flow lines and intended to facilitate operation in said five Water Purification Modes by allowing water to flow the lines in one direction and not in the opposite direction; and i) flow, temperature, pressure, tank level, and on-line electrical turbidity, $SDI_{15}$, conductivity, pH, hardness and other instrumentation and controls to ensure optimum operation and performance monitoring of said Multi-use Membrane Process.

In various exemplary embodiments, the present invention provides Multi-use Membrane processes. In an embodiment, the present invention provides A Multi-use Membrane Process where the flow streams directed through the bolded lines in FIG. 5 by automatically opening and closing the appropriate shut-off valves in such a manner and with such a timed sequence of operations as to enable operation of said Multi-use Process as an RO-$IX_c$ process with simultaneous regeneration of the exhausted IX water softening resin using the RO concentrate, comprising: a) operating first in the $IX_R$-RO mode where subscript "R" refers to IX regeneration, by introducing said Influent into one of the two parallel ion exchange (IX) water softening resin columns to remove hardness and other multivalent cations and produce Hardness-free Influent, with said two parallel IX water softening columns operating in a swing manner by switching from the exhausted IX resin column to the fresh stand-by IX resin column; b) further pretreating said Hardness-free Influent using effective pretreatment methods including but not limited to filtration, pH adjustment and addition of anti-scalant to produce Pretreated Hardness-free Influent with Silt Density Index $SDI_{15}$<5 and preferably <3; c) pressurizing and introducing said Pretreated Hardness-free Influent into said reverse osmosis (RO) membrane system to purify said Pretreated Hardness-free Influent and produce a membrane permeate Product Water and a membrane concentrate; d) recovering said Product Water at a rate in the range 80%-95% of the rate of said Influent; e) removing said membrane concentrate from said RO membrane system at a rate in the range 5%-20% of the rate of said Influent; f) diverting a fraction of said membrane concentrate having a total dissolved solids concentration (TDS)>5,000 mg/L and preferably >10,000 mg/L into an IX Regenerant Tank having a capacity in the range 100-10,000 U.S. gallons; g) switching to the high recovery RO-$IX_c$ mode by first blending said Influent water with hardness-free recycled RO concentrate to produce a blended Influent water; h) pretreating said blended Influent water using effective pretreatment methods including but not limited to filtration, pH adjustment and addition of anti-scalant to produce pretreated blended Influent water with Silt Density Index $SDI_{15}$ <5 and preferably <3; i) pressurizing and introducing said pretreated blended Influent water into said reverse osmosis (RO) membrane system to purify said Pretreated Water and produce a membrane permeate Product Water and a membrane concentrate; j) recovering said Product Water at a rate in the range 90%-99% of the rate of said Influent; k) removing said membrane concentrate from said RO membrane system at a rate in the range 25%-60% of the rate of said Influent; l) recycling said RO membrane concentrate directly under its own pressure or via the RO membrane concentrate tank and transfer pump to one of the two parallel ion exchange (IX) water softening resin columns at a rate 25%-60% of the rate of said Influent water, to remove hardness and other multivalent cations and produce hardness-free recycled RO concentrate, with said two parallel IX water softening columns operating in a swing manner by switching from the exhausted IX resin column to the fresh stand-by IX resin column; m) recovering said hardness-free recycled RO concentrate from said IX resin column, blending said hardness-free recycled RO concentrate with said Influent water to produce blended Influent water, and repeating steps (h) through (l); n) regenerate the standby exhausted IX resin column by simultaneously pressurizing and transferring said membrane concentrate from said IX Regenerant Tank to regenerate said exhausted IX resin column, producing a fresh IX resin column and a small volume of spent RO concentrate/regenerant waste; o) combining a small process reject stream from said membrane concentrate, at a rate in the range 1%-10% of the rate of said Influent water with said spent RO concentrate/IX regenerant waste to produce a combined effluent; p) removing and disposing of said combined effluent via sewer systems, wastewater treatment plants or via volume reduction type evaporators and crystallizers at a rate in the range 1%-10% of the rate of said Influent water; q) removing a small process reject stream from said membrane concentrate, in the range 1%-10% of the rate of said Influent water; and r) repeat steps (a) through (q) by switching from the RO concentrate regenerant production mode ($IX_R$-RO), steps (a) through (f), to the high recovery service mode (RO-$IX_c$), steps (g) through (m), while simultaneously performing regeneration of the exhausted IX resin column, step (n), using the RO membrane concentrate, while in the (RO-IXC) service mode.

In another embodiment, the Multi-use Membrane Process is carried out in accordance with the above Process where the flow streams are directed through the bolded lines in FIG. 1 by automatically opening and closing the appropriate shut-off valves in such a manner as to enable operation of said Multi-use Process as a simple RO water purification process comprising: a) pretreating said Influent using effective pretreatment methods including but not limited to filtration, pH adjustment and addition of anti-scalant to produce Pretreated Influent with Silt Density Index $SDI_{15}$<5 and preferably <3; b) pressurizing and introducing said Pretreated Influent into said reverse osmosis (RO) membrane system to purify said Pretreated Water and produce a membrane permeate Product Water and a membrane concentrate; c) recovering said Product Water at a rate in the range 50%-75% of the rate of said Influent; d) removing said membrane concentrate from said RO membrane system at a rate in the range 25%-50% of the rate of said Influent; and e) disposing of said membrane concentrate via sewer systems or wastewater treatment plants.

In another embodiment, the Multi-use Membrane Process is carried out in accordance with the above Process where the flow streams are directed through the bolded lines in FIG. 2 by automatically opening and closing the appropriate shut-off valves in such a manner as to enable operation of said Multi-use Process as an IX-RO water purification process comprising: a) introducing said Influent into one of the two parallel ion exchange (IX) water softening resin columns to remove hardness and other multivalent cations and produce Hardness-free Influent, with said two parallel IX water softening columns operating in a swing manner by switching from the exhausted IX resin column to the fresh stand-by IX resin column; b) further pretreating said Hardness-free Influent using effective pretreatment methods including but not limited to filtration, pH adjustment and addition of anti-scalant to produce Pretreated Hardness-free Influent with Silt Density Index $SDI_{15}$<5 and preferably <3; c) pressurizing and introducing said Pretreated Hardness-free Influent into said reverse osmosis (RO) membrane system to purify said Pretreated Hardness-free Water and produce a membrane permeate Product Water and a membrane concentrate; d) recovering said Product Water at a rate in the range 80%-95% of the rate of said Influent; e) removing said membrane concentrate from said RO membrane system at a rate in the range 5%-20% of the rate of said Influent; f) removing spent IX regenerant waste from said IX water softening column at a rate in the range 1%-5% of the rate of said Influent; and g) disposing of said membrane concentrate and said spent IX regenerant waste either separately or as a combined effluent via sewer systems, wastewater treatment plants or via volume reduction type evaporators and crystallizers.

In another embodiment, the Multi-use Membrane Process is carried out in accordance with the above Process where the flow streams are directed through the bolded lines in FIG. 3 by automatically opening and closing the appropriate shut-off valves in such a manner and with such a timed sequence of operations as to enable operation of said Multi-use Process as an $IX_R$-RO process with simultaneous regeneration of the exhausted IX water softening resin using the RO concentrate, comprising: a) introducing said Influent into one of the two parallel ion exchange (IX) water softening resin columns to remove hardness and other multivalent cations and produce Hardness-free Influent, with said two parallel IX water softening columns operating in a swing manner by switching from the exhausted IX resin column to the fresh stand-by IX resin column; b) further pretreating said Hardness-free Influent using effective pretreatment methods including but not limited to filtration, pH adjustment and addition of anti-scalant to produce Pretreated Hardness-free Influent with Silt Density Index $SDI_{15}$<5 and preferably <3; c) pressurizing and introducing said Pretreated Hardness-free Influent into said reverse osmosis (RO) membrane system to purify said Pretreated Hardness-free Water and produce a membrane permeate Product Water and a membrane concentrate; d) recovering said Product Water at a rate in the range 80%-95% of the rate of said Influent; e) removing said membrane concentrate from said RO membrane system at a rate in the range 5%-20% of the rate of said Influent; f) diverting a fraction of said membrane concentrate having a total dissolved solids concentration (TDS)>5,000 mg/L and preferably >10,000 mg/L into an IX Regenerant Tank having a capacity in the range 100-10,000 U.S. gallons; g) simultaneously pressurizing and transferring said membrane concentrate from said IX Regenerant Tank to regenerate said exhausted IX resin column, producing a fresh IX resin column and a small volume of spent RO concentrate/regenerant waste; and h) combining said membrane concentrate and said spent RO concentrate/IX regenerant waste to produce a combined effluent and disposing of said combined effluent via sewer systems, wastewater treatment plants or via volume reduction type evaporators and crystallizers.

In another embodiment, the Multi-use Membrane Process is carried out in accordance with the above Process where the flow streams are directed through the bolded lines in FIG. 4 by automatically opening and closing the appropriate shut-off valves in such a manner as to enable operation of said Multi-use Process as an RO-$IX_c$ water purification process where subscript "c" refers to water softening of the RO concentrate, comprising: a) blending said Influent water with hardness-free recycled RO concentrate to produce a blended Influent water; b) pretreating said blended Influent water using effective pretreatment methods including but not limited to filtration, pH adjustment and addition of anti-scalant to produce pretreated blended Influent water with Silt Density Index $SDI_{15}$<5 and preferably <3; c) pressurizing and introducing said pretreated blended Influent water into said reverse osmosis (RO) membrane system to purify said pretreated blended Influent water and produce a membrane permeate Product Water and a membrane concentrate; d) recovering said Product Water at a rate in the range 90%-99% of the rate of said Influent; e) removing said membrane concentrate from said RO membrane system at a rate in the range 25%-60% of the rate of said Influent; f) recycling said RO membrane concentrate directly under its own pressure or via the RO membrane concentrate tank and transfer pump to one of the two parallel ion exchange (IX) water softening resin columns at a rate 25%-60% of the rate of said Influent water, to remove hardness and other multivalent cations and produce hardness-free recycled RO concentrate, with said two parallel IX water softening columns operating in a swing manner by switching from the exhausted IX resin column to the fresh stand-by IX resin column; g) recovering said hardness-free recycled RO concentrate from said IX resin column, blending said hardness-free recycled RO concentrate with said Influent water to produce blended Influent water, and repeating steps (b) through (f); h) removing a small process reject stream from said membrane concentrate, in the range 1%-10% of the rate of said Influent water; and i) combining said process reject stream with spent IX regenerant waste to produce a combined effluent and disposing of said combined effluent via sewer systems, wastewater treatment plants or via volume reduction type evaporators and crystallizers.

In various exemplary embodiments, the Multi-use Membrane Process is carried out in accordance with any of the processes where the membranes are nanofiltration membranes, or where the ion exchange water softening resin is a sodium form strong acid cation exchange resin, weak acid cation exchange resin and chelating ion exchange resin, or where the two ion exchange resin columns are configured for co-current regeneration or counter-current regeneration, or where the ion exchange resin is gel-type, macro-porous, conventional resin or shallow shell resin.

In another embodiment, the total dissolved solids concentration of the membrane concentrate in the IX Regenerant Tank may be increased to 1%, 2%, 3%, 4%, 5%, 6%, 7%, 8%, 9% or 10% by the addition of sodium chloride salt or potassium chloride salt.

In another embodiment, the membrane concentrate is transferred directly to the IX water softening column under its own pressure driving force, thus eliminating the need for the membrane concentrate tank and the concentrate transfer pump.

In another embodiment, the Influent water is a concentrate stream originating from an existing reverse osmosis or nanofiltration process. In yet another embodiment, the Influent water is a surface water, groundwater, city water, secondary or tertiary effluent from municipal wastewater treatment plants or from industrial wastewater treatment plants, wastewater that has been treated by a membrane-biological reactor system (MBR), surface water or groundwater that has been treated by coagulation, flocculation, clarification, microfiltration, ultrafiltration, multimedia filtration or micro-metion.

BRIEF DESCRIPTION OF THE DRAWINGS

In the drawings that illustrate embodiments of the invention,

FIG. 1 shows the Influent Water 1 and 18 being introduced into RO or NF membrane system 8 via open automated valve 2, check valve 3, pretreatment step 4 where a scale inhibitor may be added, filter 5, process pump 6 and pressure and flow regulating valve 7. The membrane system 8 will produce product water 9 at a permeate (i.e. product) recovery of 50%-75%. In this low-recovery mode, the process will produce a large reject stream 12 equal to 25%-50% of the Influent flowrate, which will be discharged to sewers or to wastewater treatment plant.

FIG. 5 is a schematic representation of the best embodiment of the Multi-use High Water Recovery Process. This configuration (viz. RO-IX), is very similar to the high-recovery process configuration described under FIG. 4, where the RO or NF membrane concentrate is softened via the IX water softening resin IXA or IXB, recycled, blended with the Influent Water and introduced into the membrane system in order to achieve high recoveries in the range 95%-99% without the risk of scale deposition on the membrane surface. However, this embodiment includes improvements over the high-recovery process of FIG. 4, specifically by using the high-TDS RO concentrate from the IX Regenerant Tank to regenerate the stand-by, spent IX resin, thereby further reducing the process reject volume and maximizing the product water recovery. It will be noted that the hardness-free RO concentrate in the IX Regenerant Tank 21 will have been produced in accordance with the (IX-RO) process embodiment of FIG. 3. Said hardness-free RO concentrate 22 is drawn from the bottom of Tank 21 and transferred via pump 23 and automated valve 24 into the bottom of IXB Resin Tank 25, thereby regenerating the IX resin without using fresh water or any commercial salt. As described in the IX-RO embodiment of FIG. 3, the spent regenerant 26 is discharged either separately or it is combined with the RO rejects from automated valve 11 and discharged safely as final process rejects, 12. In this preferred embodiment of the invention, the process will produce a small reject stream 12 equivalent to 1%-5% of the Influent flowrate, which will be discharged safely to sewers or to wastewater treatment plant.

DETAILED DESCRIPTION OF THE EMBODIMENTS

Figure 1:
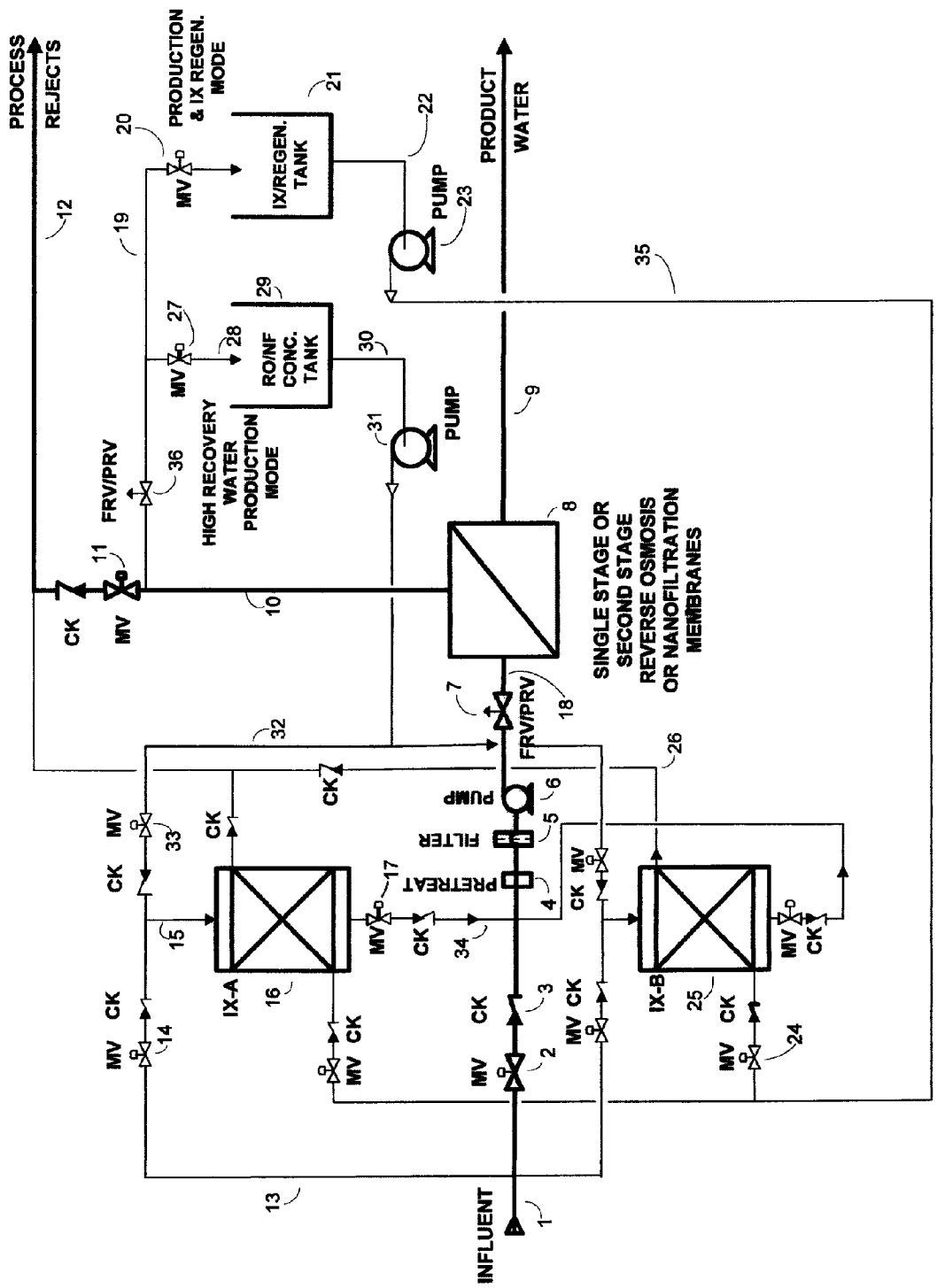
FIG. 1 is a schematic representation of the simplest process configuration of the Multi-use High Water Recovery Process, which is the RO membrane process.
Figure 2:
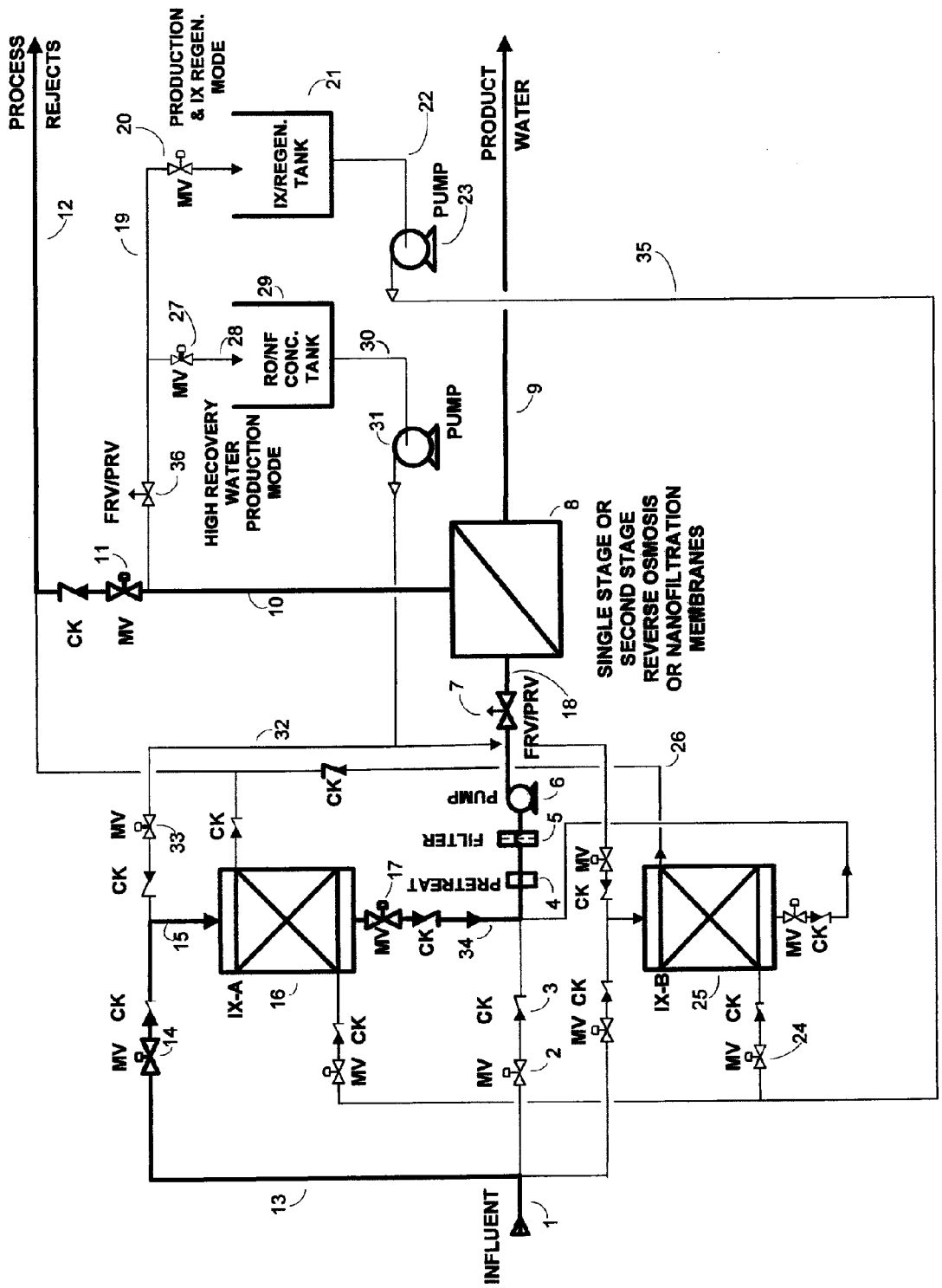
FIG. 2 is a schematic representation of another embodiment of the Multi-use Process (viz. IX-RO) where IX water softening resin IXA or IXB is used as additional pretreatment to the prefiltered and preconditioned Influent Water, thus achieving improved product water recovery in the range 80%-95%. Therefore, Influent Water 13 is introduced into one of the two parallel IX resin columns, IXA (16) via automated valve 14, exiting the IX column as stream 34 via automated valve 17 and subsequently admitted into the RO system 8 via pretreatment unit 4, filter 5, process pump 6 and flow/pressure regulating valve 7. The product water is removed from the RO membranes as stream 9 and the 5-20% system reject 12 is discharged safely to sewers or to a wastewater treatment plant.
Figure 3:
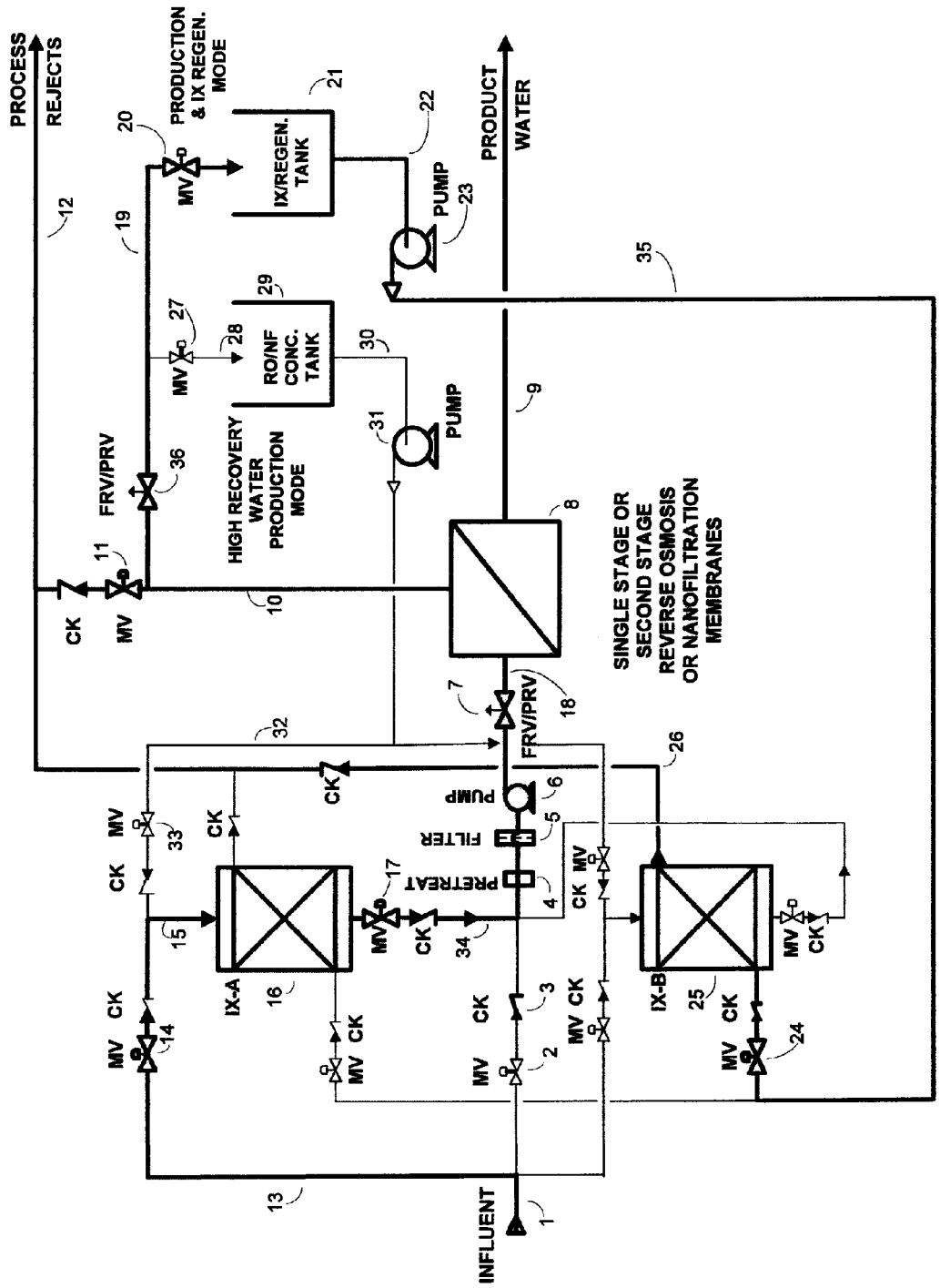
FIG. 3 is a schematic representation of yet another embodiment of the Multi-use Process (viz. IX-RO) where IX water softening resin IXA or IXB is used as additional pretreatment to the prefiltered and preconditioned Influent Water, thus achieving improved product water recovery in the range 80%-95%. In this process configuration, the RO concentrate is collected in the IX Regenerant Tank and subsequently used to regenerate the IX resin, thus saving an additional 1-5% of water, based on the Influent Water flowrate. Therefore, Influent Water 13 is introduced into one of the two parallel IX resin columns, IXA (16) via automated valve 14, exiting the IX column as stream 34 via automated valve 17 and subsequently admitted into the RO system 8 via pretreatment unit 4, filter 5, process pump 6 and flow/pressure regulating valve 7. The product water is removed from the RO membranes as stream 9 and the 5-20% system reject 12 is discharged safely to sewers or to a wastewater treatment plant. In this process configuration, a fraction of the RO concentrate 19 is diverted to the IX Regenerant Tank 21, wherefrom it is pumped via transfer pump 23 into the bottom of the exhausted IX resin column, IXB (25) via automated valve 24. The spent regenerant 26 is discharged safely either separately or it is combined with the RO rejects from automated valve 11 and discharged safely as final process rejects, 12.
Figure 4:
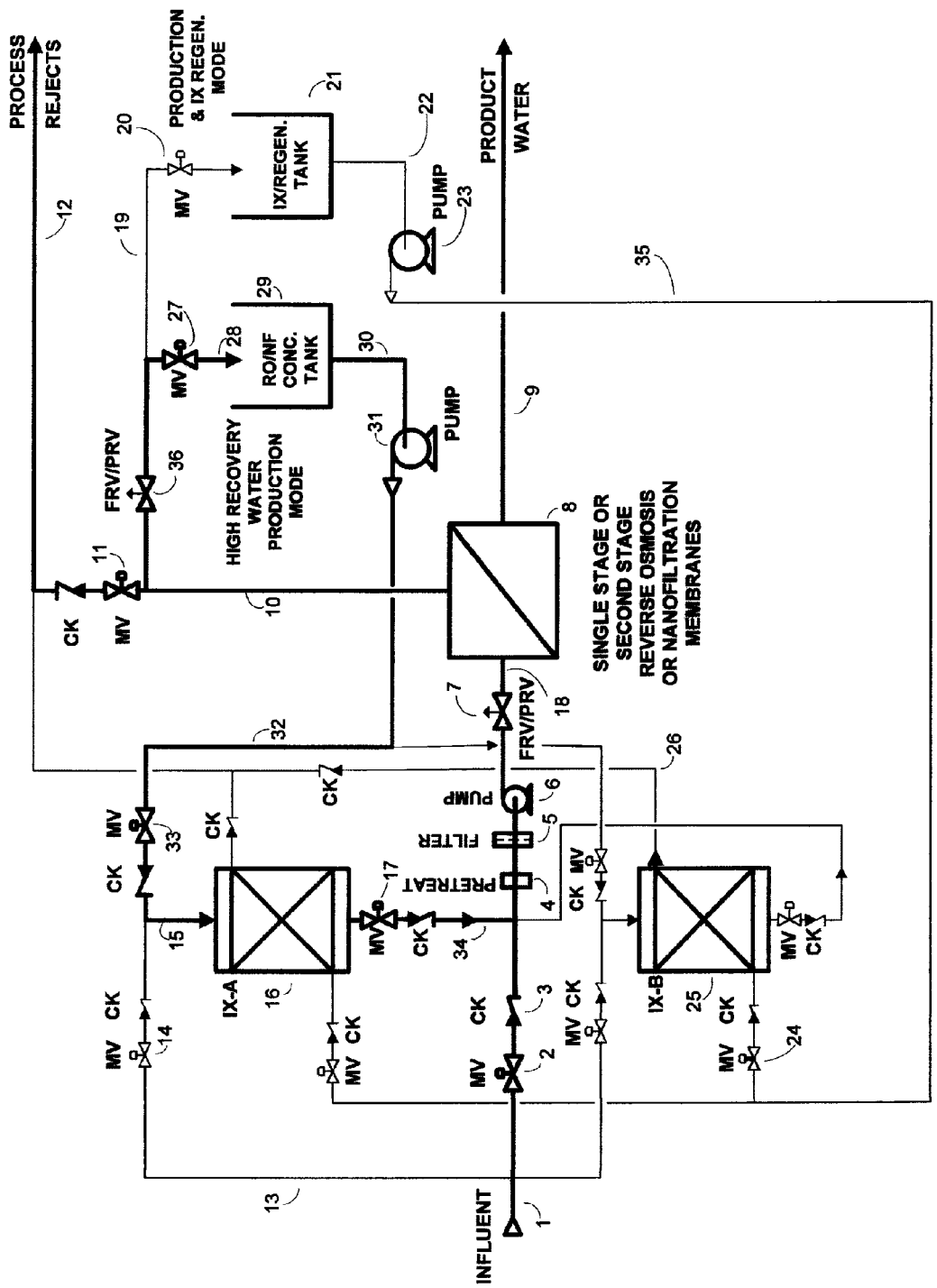
FIG. 4 is a schematic representation of yet another embodiment of the Multi-use High Water Recovery Process. In this configuration (viz. RO-IX), the IX water softening resin IXA or IXB is used downstream from the RO membranes, thereby removing preconcentrated hardness ions effectively and preventing their build-up and deposition over the RO membrane surface, thus achieving improved product water recovery in the range 90%-99%. Therefore, Influent Water 1 is introduced into RO or NF membrane system 8 via open automated valve 2, check valve 3, pretreatment step 4 where a scale inhibitor may be added, filter 5, process pump 6 and pressure and flow regulating valve 7. The membrane system 8 will produce product water 9 at a permeate (i.e. product) recovery of 90%-99%. A large fraction of the RO concentrate 28 equivalent to 25%-60% of the Influent Water volume is introduced into the RO/NF Concentrate Tank 29 via flow/pressure regulating valve 36 and via automated shut-off valve 27. This membrane concentrate 30 is drawn from the bottom of the tank and recycled via pump 31, line 32 and automated valve 33 to the top of one of the two available parallel water softening IX resin columns, IXA (16) where hardness and other multivalent ions are removed efficiently. Softened, hardness-free membrane concentrate 34 is drawn from the bottom of IXA (16) via automated valve 17, blended with the Influent Water 1 and pumped through the RO or NF membrane system 8, thereby achieving high overall product water recoveries in the 90%-99% without the risk of scale deposition on the membrane surface. In this high-recovery mode, the process will produce a small reject stream 12 equivalent to 1%-10% of the Influent flowrate, including the spent IX regenerant, which will be discharged safely to sewers or to wastewater treatment plant.

This invention addresses the limitations associated with prior art ion exchange water softening methods and high recovery membrane-based water purification methods. The invention relates to the economical purification of water containing soluble and sparingly or partially soluble inorganic compounds using single-stage or 2-stage membrane processes that integrate efficient membrane water purification with ion exchange (IX) softening for continuous removal of hardness.

The present invention teaches a versatile process that aims at mitigating scale formation and maximizing the membrane permeate recovery while simultaneously eliminating the use of fresh water and commercial salt for ion exchange resin regeneration by using the membrane concentrate to regenerate the water softening IX resin. This multi-use membrane-based system and process can be used to achieve different process configurations that address several water purification scenarios that depend on the Influent Water quality and water treatment objectives.

The simplest embodiment of this invention involves operation of the multi-use system as a reverse osmosis (RO) membrane process to purify water from an already pretreated Influent Water source by simple, manual or automated switching of shut-off valves on or off in a predetermined sequence. As an example, this simple RO embodiment may be used to produce small volumes of purified domestic or commercial drinking or potable water, starting with Influent City Water or clean ground water having a 15-minute Silt Density Index ($SDI_{15}$)<5 and preferably <3, iron and manganese concentrations <0.1 mg/L and a turbidity <0.1 Nephelometric Turbidity Units (NTU), where the cost of water is low and there is no economical incentive to increase the purified water recovery. In this simplest embodiment of the current invention, a purified water recovery in the range 50-75% is acceptable. This simple RO scenario will also apply where the Influent water total dissolved solids (TDS) is high, in the range 5,000-10,000 mg/L, thereby limiting the maximum achievable purified water recovery by the RO membrane system due to osmotic pressure limitation associated with the RO membrane concentrate.

Another embodiment of this invention is operation of the multi-use system in the IX-RO process configuration where SAC IX water softening resin is used as additional pretreatment to the prefiltered and preconditioned Influent Water. This process embodiment can be selected by simple switching of manual or automated shut-off valves on or off to divert the Influent Water through the IX water softener, followed by the RO membranes, thereby achieving higher product water recovery efficiencies in the range 70-80%, while maintaining efficient operation of the membranes and preventing fouling and scale formation and deposition on the membrane surface. By using a scale-inhibitor as a preconditioning step for the Influent Water, this embodiment can achieve a purified water recovery in the range 80-95%, assuming no osmotic pressure limitations, i.e. that the Influent Water TDS is not limiting. This IX-RO embodiment may be used to provide moderate flowrates (e.g. 50-200 gpm) of good quality RO-purified water as make-up to cooling towers and boilers used in chemical manufacturing and consumer product industries.

Yet another embodiment of this invention is represented by operation of the multi-use system in the $IX_R$-RO configuration, as described above, by simple switching of manual or automated shut-off valves in a predetermined sequence to divert the Influent Water to the IX water softener, followed by the RO membranes. The "R" subscript in the term: $IX_R$-RO represents the added feature of IX regeneration. In order to reduce the operating cost and reduce the volume of process rejects discharged to sewers or to the wastewater treatment plants, this embodiment involves diverting RO concentrate of sufficiently high strength, i.e. >1% to an IX Regeneration Storage Tank and periodically using this RO concentrate to regenerate the exhausted IX resin, while a second fresh IX resin is being used in the service mode (i.e. water purification mode). Shallow Shell IX resin, including the SST65 and SST80DL by The Purolite Company, may be used in lieu of conventional SAC resin in the IX water softening/pretreatment step. It is estimated that this multi-use system embodiment will achieve an estimated net product water recovery in the range 85%-95% of the Influent Water. As described in the IX-RO configuration, this embodiment can be used to provide purified industrial plant water for cooling tower and boiler make-up as well as other high purity plant water applications including dilution water for make up of chemicals and laboratory water use, where the RO product water can be further demineralized by passage through existing mixed bed ion exchange demineralizing resins.

Yet another embodiment of this invention is represented by operation of the multi-use high water recovery system in the high-recovery RO-$IX_c$ configuration, by simple switching of manual or automated shut-off valves in a predetermined sequence to divert the Influent Water to the RO membranes as a first step. The "c" subscript in the RO-$IX_c$ term refers to use of the IX resin to treat the RO membrane concentrate, i.e. as a water softener, contrary to the more common use of IX resin as a demineralizing material to remove residual ionic species from RO membrane permeates which will produce a completely demineralized water. According to this embodiment, most of the concentrate produced by the RO membranes is sent to the IX water softener, followed by recycling of the hardness-free RO concentrate at a sufficiently high flowrate in the range 25%-60% of the Influent Water, combining said IX-softened RO concentrate with the Influent Water and introducing the combined flow into the RO membranes to produce more permeate, thereby achieving product water recoveries >90% and even >95%, depending on the TDS of the Influent Water. This embodiment can be used to provide purified water for industry and for municipalities, especially in locations where surface water or sewer systems are not available or where the water cost is high, i.e. >$4 per 1000 gallons, which will provide the economical incentive to achieve said high product water recoveries.

The best embodiment of this invention is also represented by operation of the multi-use high water recovery system in the high-recovery RO-$IX_c$ configuration, as described above, except that in this case it is coupled with an IX resin regeneration step using the RO concentrate. By selecting the appropriate positions of the manual or automated shut-off valves, the flow is initially directed through one of the two IX resin columns followed by the RO membranes (i.e. IX-RO), operating at up to 90% permeate recovery to produce product water as well as a high-TDS RO concentrate. The RO concentrate, having a TDS concentration>5,000 mg/L and preferably >10,000 mg/L, is directed to the IX Regenerant Tank. It will take approximately 2 hr. to produce a sufficient volume of RO concentrate (brine) for complete regeneration of an exhausted IX resin column. Once the Regenerant Tank is full, the flow is diverted automatically to the high-recovery RO-$IX_c$ mode of operation. According to this embodiment, most of the concentrate produced by the RO membranes is sent to the IX water softener, followed by recycling of the hardness-free RO concentrate at a sufficiently high flowrate in the range 25%-60% of the Influent Water, combining said IX-softened RO concentrate with the Influent Water and introducing the combined flow into the RO membranes to produce more permeate, thereby achieving product water recoveries >90% and even >95%, depending on the TDS of the Influent Water. Simultaneously, the RO concentrate in the IX Regenerant Tank is used to regenerate the IX resin in the exhausted IX Resin Column. This automated IX regeneration procedure will take approximately 2 hr. to complete, operating independently of the RO-$IX_c$ service cycle. Regeneration includes a fast backflush step for 2-3 min. in counter-flow direction at a flowrate of 15-25 gpm/ft$^2$ of IX resin column cross sectional area, followed by slow "brining" regeneration step preferably in a counter-flow direction at a slow rate of 1-2 gpm/ft$^2$ for a period of approximately 1 hr. using the RO concentrate to displace hardness ions from the IX resin, a slow co-current (i.e. downflow) rinse at a slow rate of 1-2 gpm/ft$^2$ using the RO permeate for 30-45 min. and a final fast co-current rinse for 3-5 minutes, at a rate of 10-15 gpm/ft$^2$. When the service IX resin is exhausted, the above cycle is repeated by automatic switching of shut-off valves, based on a timer, on-line analysis of water effluent from the IX resin column and the level in the IX Regenerant Tank (IRT). The cycle will therefore start by running the IX-RO mode to fill the IX Regenerant Tank with high-TDS RO concentrate, followed by normal high-recovery process operation (i.e. RO-$IX_c$) and simultaneously regenerating the exhausted (i.e. spent) IX resin using the RO concentrate produced in the earlier step. Since there are two IX Resin Columns, IXA and IXB, the following steps will be automatically performed sequentially:

IXA-RO-IRT (Brine Production Mode via 1$^{st}$ IX resin as well as RO Purification)
RO-IXA, plus IRT-IXB (High Recovery RO+simultaneous 2$^{nd}$ IX Regen)
IXB-RO-IRT (Brine production via 2$^{nd}$ IX resin)
RO-IXB, plus IRT-IXA (High Recovery RO+simultaneous 1$^{st}$ IX Regen)

In this manner, high net product water recoveries >95% can be achieved, depending on the Influent Water TDS, while obviating the need to use commercial salt. Any rinsewater used in regenerating the IX resin can be recycled and blended with the Influent Water in order to minimize the process rejects. In order to minimize the scale potential due to the silica, high-efficacy scale inhibitors will be injected into the Influent Water at a suitable low dosage of 1-5 mg/L.

Since the current invention introduces the Influent Water directly into the RO membrane system, said Influent Water must have been pretreated to remove suspended solids and other colloidal and particulate matter, oils and organic compounds that might cause significant organic and biological fouling of the RO membranes, as well as iron, manganese and aluminum. Concentration of these compounds shall be reduced to <0.1 mg/L, <0.1 mg/L and <0.05 mg/L, respectively, thereby achieving a desirable 15-min Silt Density Index, $SDI_{15}$ of <5 and preferably <3 resulting in acceptably low surface fouling of the RO membranes.

This embodiment can be used to provide purified water for industry and for municipalities, especially in locations where surface water or sewer systems are not available or where the water cost is high, i.e. >$4 per 1000 gallons, which will provide the economical incentive to achieve said high product water recoveries. This embodiment of the multi-use high water recovery process can also be used as an important constituent of Zero Liquid Discharge (ZLD) applications where no liquid effluent or liquid rejects are discharged from the site where purified water is produced. ZLD is applied when the water availability is very limited, the water cost is high, as described above and where there are no sewer systems or suitably located wastewater treatment plants to accept the industrial plant effluents. The small process reject volume produced in this embodiment can be evaporated in an economical manner by using, for example, mechanical vapor recompression evaporators or other suitable water evaporation devices.

While the invention has been described in terms of preferred embodiments, the claims appended hereto are intended to encompass other embodiments that fall within the spirit of the invention.

What is claimed is:

1. A Multi-use Membrane Process, wherein flow streams are directed by automatically opening and closing shut-off valves in such a manner and with such a timed sequence of operations as to provide a reverse osmosis (RO) process followed by ion exchange (IX) of RO concentrate (RO-$IX_C$) with simultaneous regeneration of exhausted IX water softening resin using the RO concentrate, comprising:

a) providing a multi-use membrane system comprising:
   dual IX water softening resin columns comprising an exhausted IX water softening resin column and a fresh stand-by IX resin column alternating in operation with a first column operating in a service mode and a second column in a regeneration mode;
   a RO membrane system used to purify an influent;
   an IX regenerant solution holding tank;
   a membrane concentrate holding tank to provide membrane concentrate for recycle through said dual IX water softening resin columns;
   pumps used to pressurize said influent to said RO membrane system, transfer said membrane concentrate to said dual IX water softening resin columns, or transfer said membrane concentrate from said IX regenerant solution holding tank; and
   automated motorized valves, solenoid valves or air-operated shut-off valves, wherein the valves are opened and closed automatically in a predetermined sequence;

b) operating in an ion exchange regeneration mode ($IX_R$-RO) by introducing said influent into one of said dual IX water softening resin columns to remove hardness and other multivalent cations and produce hardness-free influent with said dual IX water softening resin columns alternating in operation by switching from said exhausted IX water softening resin column to said fresh stand-by IX resin column;

c) pretreating said hardness-free influent using pretreatment methods selected from the group consisting of filtration, pH adjustment and addition of anti-scalant to produce pretreated hardness-free influent with Silt Density Index $SDI_{15}$<5;

d) pressurizing and introducing said pretreated hardness-free influent into said RO membrane system to purify said pretreated hardness-free influent and produce a membrane permeate product water and a membrane concentrate;

e) recovering said membrane permeate product water at a rate in the range 80%-95% of a rate of said influent;

f) removing said membrane concentrate from said RO membrane system at a rate in the range 5%-20% of the rate of said influent;

g) diverting a fraction of said membrane concentrate having a total dissolved solids concentration (TDS) >5,000 mg/L into said IX regenerant solution holding tank;

h) switching to a high recovery mode (RO-$IX_C$) by first blending said influent with a hardness-free recycled RO concentrate to produce a blended influent water;

i) pretreating said blended influent water using pretreatment methods selected from the group consisting of filtration, pH adjustment and addition of anti-scalant to produce pretreated blended influent water with Silt Density Index $SDI_{15}$<5;

j) pressurizing and introducing said pretreated blended influent water into said RO membrane system to purify said pretreated blended influent water and produce said membrane permeate product water and said membrane concentrate;

k) recovering said membrane permeate product water at a rate in the range 90%-99% of the rate of said influent;

l) removing said membrane concentrate from said RO membrane system at a rate in the range of 25%- 60% of the rate of said influent;

m) recycling said membrane concentrate directly under said membrane concentrate's own pressure or via said membrane concentrate holding tank and at least one of the pumps to one of said dual IX water softening resin columns at a rate in a range 25%-60% of the rate of said influent, with said dual IX water softening resin columns alternating in operation by switching from the exhausted IX water softening resin column to the fresh stand-by IX resin column to produce said hardness-free recycled RO concentrate;

n) recovering said hardness-free recycled RO concentrate from said fresh stand-by IX resin column, blending said hardness-free recycled RO concentrate with said influent to produce said blended influent water, and repeating steps (i) through (m);

o) regenerating said exhausted IX water softening resin column by simultaneously pressurizing and transferring said membrane concentrate from said IX regenerant solution holding tank, and producing said fresh stand-by IX resin column and a volume of spent IX regenerant waste;

p) combining a process reject stream from said membrane concentrate, at a rate in the range 1%-10% of the rate of said influent with said spent IX regenerant waste to produce a combined effluent;

q) removing and disposing of said combined effluent via sewer systems, wastewater treatment plants or via volume reduction type evaporators and crystallizers at a rate in the range 1%-10% of the rate of said influent; and r) repeating steps (b) through (q) by switching from said ion exchange regeneration mode ($IX_R$-RO), steps (b) through (g), to said high recovery mode (RO-$IX_C$), steps (h) through (n), while simultaneously performing regeneration of said exhausted IX water softening resin column, step (o), using said RO membrane concentrate, while in said high recovery mode (RO-$IX_C$).

2. The Multi-use Membrane Process in accordance with claim 1 where said RO membrane system contains nanofiltration membranes.

3. The Multi-use Membrane Process in accordance claim 1 where said dual IX water softening resin columns contain a sodium form strong acid cation exchange resin, weak acid cation exchange resin or chelating ion exchange resin.

4. The Multi-use Membrane Process in accordance with claim 1 where the dual IX water softening resin columns are configured for co-current regeneration or counter-current regeneration.

5. The Multi-use Membrane Process in accordance with claim 1 where said dual IX water softening resin columns contain gel-type, macro-porous, conventional resin or shallow shell resin.

6. The Multi-use Membrane Process in accordance with claim 1 where a total dissolved solids concentration of said membrane concentrate in said IX regenerant solution holding tank may be increased to 1%, 2%, 3%, 4%, 5%, 6%, 7%, 8%, 9% or 10% by the addition of sodium chloride salt or potassium chloride salt.

7. The Multi-use Membrane Process in accordance with claim 1 where said membrane concentrate is transferred directly to one of said dual IX water softening resin columns under said membrane concentrate's own pressure, thus eliminating the need for said membrane concentrate holding tank and said pumps.

8. The Multi-use Membrane Process in accordance with claim 1 where said influent is a concentrate stream originating from an existing reverse osmosis or nanofiltration process.

9. The Multi-use Membrane Process in accordance claim 1 where said influent is a surface water, groundwater, city water, secondary or tertiary effluent from municipal wastewater treatment plants or from industrial wastewater treatment plants, wastewater that has been treated by a membrane-biological reactor system (MBR), surface water or groundwater that has been treated by coagulation, flocculation, clarification, microfiltration, ultrafiltration or multimedia filtration.

* * * * *